United States Patent [19]

Watabe et al.

[11] 4,400,940
[45] Aug. 30, 1983

[54] RESONANT TYPE APPARATUS FOR ABSORBING WAVE ENERGY ARRANGED AT WAVE-BREAKING FACILITIES

[75] Inventors: Tomiji Watabe, Noboribetsu; Hideo Kondo, Muroran; Kyokai Okuda, Muroran; Kenji Yano, Muroran; Seiichi Asano, Takaishi, all of Japan

[73] Assignee: Muroran Institute of Technology, Muroran, Japan

[21] Appl. No.: 238,523

[22] Filed: Feb. 26, 1981

[30] Foreign Application Priority Data

Mar. 5, 1980 [JP] Japan .............................. 55/26725

[51] Int. Cl.³ .............................................. F03B 13/12
[52] U.S. Cl. ................................. 60/502; 60/398; 417/330
[58] Field of Search .................... 417/330, 331, 332; 60/398, 502

[56] References Cited

U.S. PATENT DOCUMENTS

| | | | |
|---|---|---|---|
| 888,721 | 5/1908 | Milbury | 417/332 |
| 956,796 | 5/1910 | Butler | 417/330 |
| 970,048 | 9/1910 | Harmon | 60/502 |
| 1,887,316 | 11/1932 | Lockfaw | 417/330 |
| 4,115,034 | 9/1978 | Smith | 417/332 |

*Primary Examiner*—A. Michael Chambers
*Attorney, Agent, or Firm*—Spencer & Kaye

[57] ABSTRACT

A resonant type apparatus for absorbing wave energy arranged at wave-breaking facilities, which comprises, a caisson having a bottom plate, side plates, a backside plate and a top plate at least a part of which is omitted. A water chamber in the caisson has a length in a directional parallel to the side walls which is larger than ¼ of the wave length Lc of a stationary wave within the water chamber, and a node of the stationary wave in the water chamber is formed at a distance Lc/4 from the backside plate. A pendulum is arranged at the position of the node of the stationary wave for swinging with a natural period Tp which is substantially the same value as the natural period Tw of the stationary wave, whereby the pendulum is swung by the stationary wave to absorb and convert wave energy to useful available energy at high efficiency.

7 Claims, 6 Drawing Figures

RESONANT TYPE APPARATUS FOR ABSORBING WAVE ENERGY ARRANGED AT WAVE-BREAKING FACILITIES

BACKGROUND OF THE INVENTION

The present invention relates to an apparatus for absorbing wave energy, particularly to a resonant type apparatus for absorbing wave energy arranged at wave-breaking facilities such as a bank or a sea bulwark, etc.

Previously, the inventors have filed patent application Serial No. 185,620 on Sept. 9, 1980 for "Apparatus For Absorbing Wave Energy at Wave-breaking Facilities". However, this apparatus has a drawback in that its energy recovery efficiency has a low value of about 10% or less.

SUMMARY OF THE INVENTION

An object of the present invention is to provide a resonant type apparatus for absorbing wave energy of low investment and maintenance costs which is arranged at wave-breaking facilities such as a bank or a sea bulwark, etc., and capable of providing low cost energy by improving the energy recovery efficiency.

In the present invention, a caisson having a bottom plates, side plates, a backside plates, an open front surface and a top plate, at least a part of which is omitted, is used as a structural element of a sea-facing side of a bank or sea bulwark. The water chamber length $Bc'$ of the caisson in a direction parallel to the side plates is larger than ¼ of the wave length $Lc$ of a stationary wave generated in the water chamber. The stationary wave generated in the caisson forms a node in the water chamber at a distance $Lc/4$ from the backside plate, and a pendulum swinging in a natural period $Tp$, which is substantially the same value as the natural period of the stationary wave $Tw$, is arranged at the position of the node of the stationary wave to swing the pendulum by the stationary wave motion, whereby the wave energy is absorbed and converted to useful available energy such as electric energy or thermal energy.

DETAILED EXPLANATION OF THE INVENTION

The apparatus of the present invention has many advantages, particularly when a hydraulic cylinder is used for converting the wave energy to hydraulic energy, in that the apparatus not only absorbs and converts wave energy efficiently to electric or thermal energy, but also has a simple and strong structure. Further, investment and maintenance costs can be decreased considerably since substantially all devices such as bearings and the like which necessitate maintenance are not located below the water level.

In another aspect of the present invention, the pendulum and an energy converting device driven directly by the pendulum are mounted on a carrier or support displaceable by a suitable means such as rails, pinion rack, piston cylinder or the like, so that the position of the pendulum is adjusted by displacing the carrier. By this arrangement, the pendulum can easily be placed at a position where the node of the stationary wave occurs. In this case, by providing a device which monitors the wave length in the water chamber and a means to displace automatically the carrier depending on the monitored value of the wave length in the water chamber, the pendulum can automatically be positioned at a point where the node of the stationary wave occurs, so that a high efficiency for recovering wave energy can always be achieved.

In a further aspect of the present invention, the pendulum is provided with at least one resilient member at its top side for adjusting the fundamental cycle of the pendulum by varying the influence of the resilient member upon the pendulum. In this case, it is preferable to use a resilient member the spring constant of which is adjustable.

BRIEF DESCRIPTION OF THE DRAWINGS

For a better understanding of the present invention, reference is made to the accompanying drawings, in which.

Figure 1:
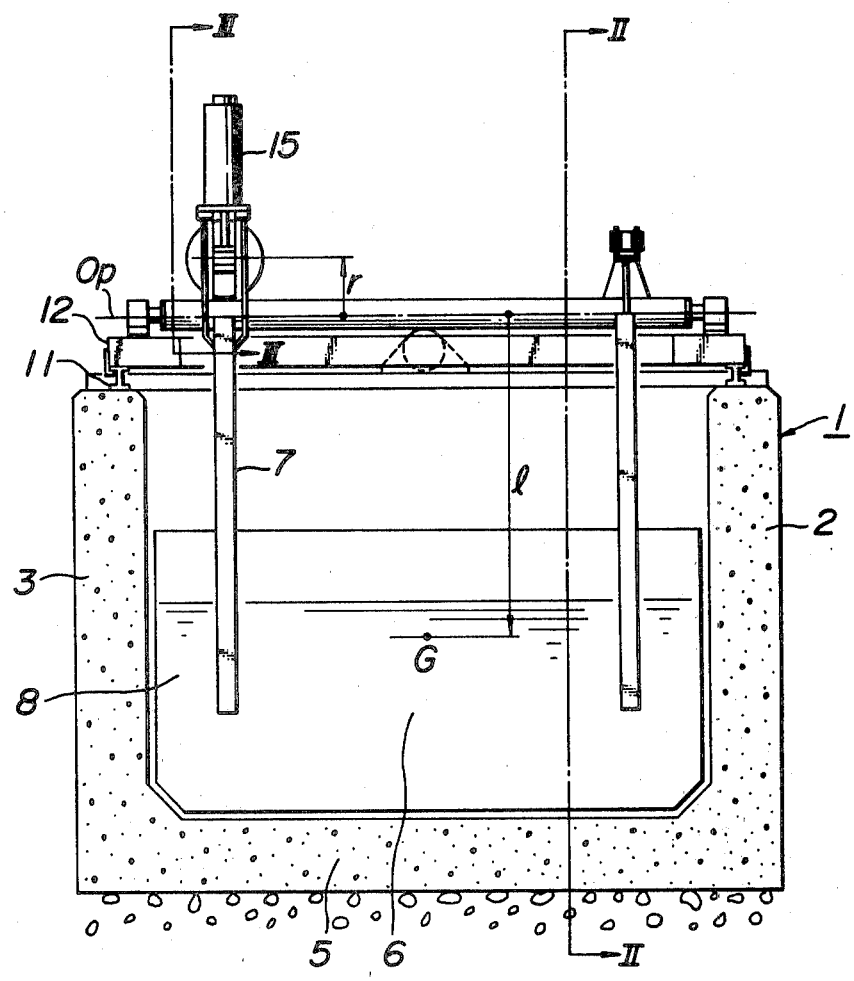
FIG. 1 is a front view of an embodiment of the present apparatus partially shown in cross section.

Throughout different views of the drawings, 1 is a caisson; 2, 3 are side walls of the caisson; 4 is a backside plate of the caisson 1; 5 is a bottom plate of the caisson 1; 6 is a water chamber; 7 is a pendulum; 8 is a pressure-receiving plate of the pendulum 7; 9 is a bank; 10 is a cylinder; 11 is a rail; 12 is a carrier; 13 is a cylinder; 14 is a resilient member; 15 is a cylinder; 20, 21 are change-over valves; 22 is a pressure accumulator; 23 is a tank; 24 is a rectifying valve; 25 is a high pressure pipeline; 26 is a return pipeline; 27 is a stop valve; 28 is a nozzle; 29 is a turbine; 30 is a hydraulic motor; 31 is a hydraulic pump; 32 is a pipeline; 33 is an orifice; 34 is a heat exchanger; A is the point where the resilient member 14 is attached to the pendulum; $Bc'$ is the length of the water chamber; $Bc$ is the distance between the backside plate 4 and the pendulum 7 in the direction parallel to the side walls; G is the gravitational center of the pendulum; g is the gravitational acceleration; $Hc$ is the water depth in the water chamber; $hp$ is the height of the pressure-receiving plate 8; $Ip$ is the moment of inertia of the pendulum about the swinging center $Op$; K is the opening ratio of the orifice 33; $Ks$ is the spring constant of the resilient member 14; $Lc$ is the wavelength of the stationary wave generated in the water chamber; l is the distance from the center of the carrier 12 to the gravitational center G of the pendulum; m is the pendulum weight; $Op$ is the swinging center of the pendulum; r is the distance from the point A to the point $Op$; $Tp$ is the natural period of the pendulum; $Tw$ is the natural period of wave motion; tanh is the tangent value of the hyperbolic function; $Wp$ is the work rate obtained by the pendulum 7; and $Wi$ is the work rate of an incident wave.

DESCRIPTION OF THE PREFERRED EMBODIMENTS

Hereinafter, the present invention will be explained in more detail with reference to the accompanied drawings which however should not be construed by any means as limitations of the present invention.

Figure 2:
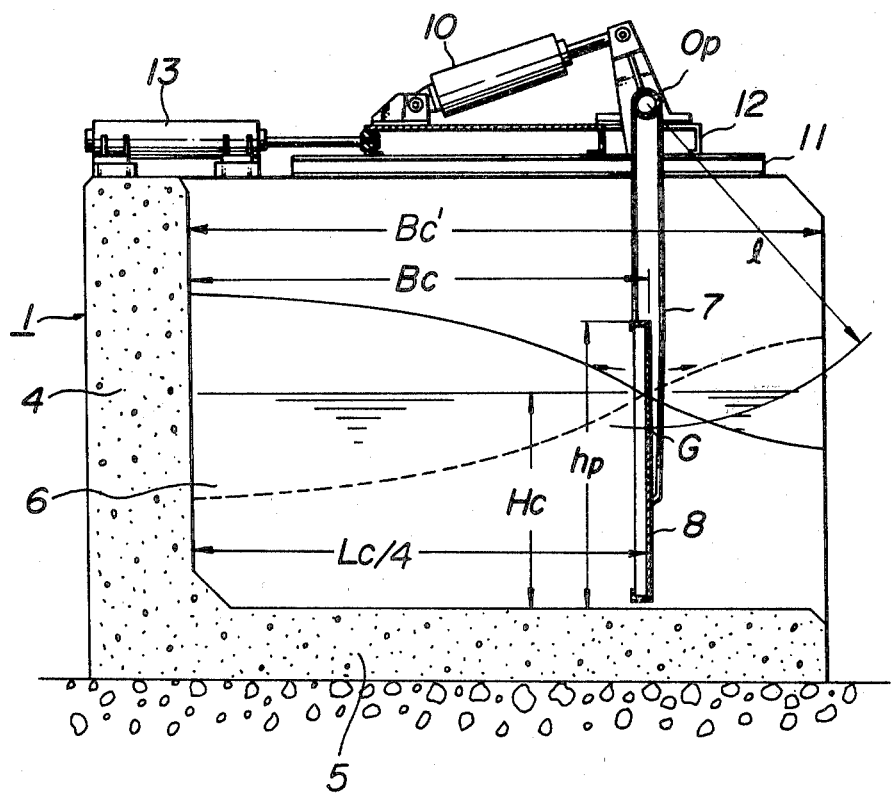
FIG. 2 is a cross section of FIG. 1 taken along the line II—II.
Figure 3:
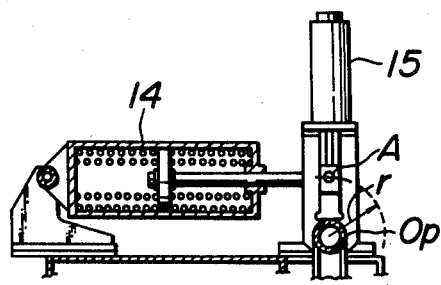
FIG. 3 is a cross section of FIG. 1 taken along the line III—III.

In FIGS. 1-3, a reinforced concrete caisson 1 not having a top plate is arranged to face the sea so as to function as a bank or wave-breaking facilities. The caisson 1 has a front surface opened to the sea, side walls 2 and 3, a backside plate 4 and a bottom plate 5. A pendulum 7 having a pressure-receiving plate 8 is arranged at a node of the stationary wave formed in the water chamber 6; namely, at a distance of ¼ of the wave length Lc of the stationary wave generated in water chamber 6. By this arrangement, the horizontal speed of the water particles is maximum at the position of the pendulum 7, and hence the kinetic pressure of the water particles exerts an action on the pressure-receiving plate 8 of the pendulum 7 to swing the pendulum 7 around a center point Op. This swinging movement is transmitted to a cylinder 10 and converted therein to hydraulic energy which is subsequently converted to thermal or electric energy for utilization.

Figure 4:
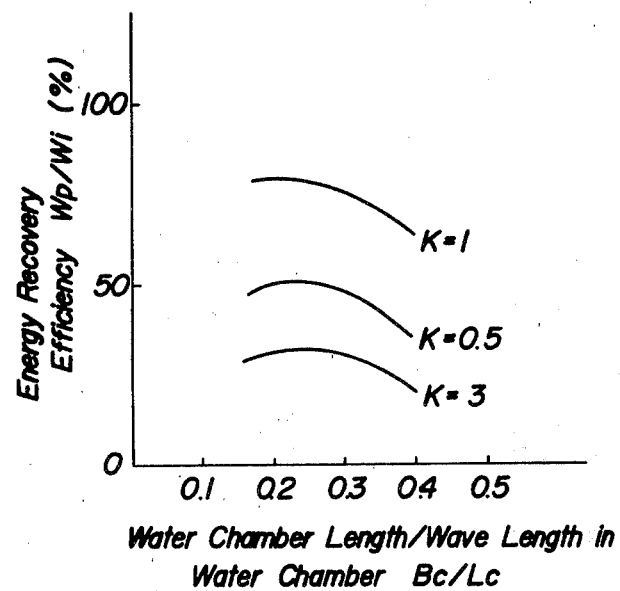
FIG. 4 is a characteristic graph showing the relation between the energy recovery efficiency $Wp/Wi$ and the ratio $Bc/Lc$ of the water chamber length $Bc$ to wave length $Lc$ in the water chamber.

FIG. 4 shows experimental data obtained with the embodiment of the present invention shown in FIGS. 1-3. The abscissa shows the ratio Bc/Lc, where Bc is the length of the water chamber from the backside plate 4 to the pendulum 7 and Lc is the wavelength of the stationary wave generated in the water chamber. The ordinate shows the energy recovery efficiency Wp/Wi. The parameter K shows the opening ratio of the orifice 33 of FIG. 5.

As seen from FIG. 4, the energy recovery efficiency Wp/Wi values are much higher as compared with those of about 10% or less of the inventors' prior apparatus disclosed in the aforesaid copending U.S. application Ser. No. 185,620. Thus, it is clear that the apparatus of the present invention is exceedingly suited to absorption of wave energy. The values of energy recovery efficiency Wp/Wi have the maximum value when the ratio Bc/Lc=0.25; namely, when the pendulum is arranged at the position of the node of the stationary wave of sea water, i.e. at a distance Lc/4 from the backside plate 4 in the direction parallel to the side walls 2, 3.

Wave length Lc in the water chamber 6 is given by the following equation:

$$Lc = \frac{gTw^2}{4\pi} \tanh \frac{2\pi Hc}{Lc}$$

In the above equation, water depth Hc in the water chamber varies depending on the tide level, and the natural period Tw of the wave also varies depending on weather conditions, so that the value Lc and hence the value Bc/Lc vary depending on the changes of Hc and Tw. Therefore, the energy recovery efficiency is unavoidably decreased.

The energy recovery efficiency is highest when the natural period Tp of the pendulum and the natural period of the wave Tw coincide and resonate with each other. Nevertheless, the natural period of the wave Tw changes depending on weather conditions, so that Tp and Tw do not always coincide with each other and hence a decrease of the energy recovery efficiency has been unavoidable.

Even in such a situation, a decrease of the energy recovery efficiency does not occur at all according to the present invention.

In FIGS. 1-3, the pendulum 7, the cylinder 10 and other members are assembled on a carrier 12 which is slidably arranged on rails 11 and displaceable by a cylinder 13, so that the pendulum 7 can maintain in any situation the ratio Bc/Lc at approximately the value ¼ by adjusting the position of the pendulum 7. A resilient member 14 is pivotally connected to a horizontal axis A engaged at the top of the pendulum 7. The level of the horizontal axis mounted on the top of the pendulum 7 is adjustable by any suitable means such as cylinder 15. The cylinder 15, having a piston at its lower side, is engaged on top of the pendulum 7 in such a manner that its piston is connected to the axis A and it can adjust the radius r which corresponds to the distance between the swinging center Op of the pendulum and the horizontal axis A. In this case, the natural period Tp of the pendulum 7 is expressed by the following equation:

$$Tp = 2\pi \sqrt{\frac{I_p}{g(ml + Ksr)}}$$

wherein,
g is the gravitational acceleration,
Ip is the moment of inertia of the pendulum,
m is the pendulum weight,
l is the distance between the point OP and centroid G of the pendulum,
Ks is the spring constant of the resilient member.

Said natural period Tp can be changed by changing the radius r by adjusting the cylinder 15, so that even when the natural period of the wave Tw is changed, the natural period Tp can be changed depending on the change of the period Tw to maintain the resonant state. The resonant state of the pendulum can also be maintained by changing the number and/or the spring constant Ks of the resilient member 14.

In the apparatus of the present invention, all elements are arranged above the water level except for the caisson and the pendulum which hangs down in the water, and the forces respectively acting on the swinging center Op, the cylinder 10 and the resilient member 14 are offset from each other on the carrier 12, so that only a force difference remains after the offset of these forces exerts an action on the cylinder 13. As a result, many caissons 1 which have already been prepared and arranged by the inventors' prior copending application U.S. Ser. No. 185,620 need not be reinforced or modified in shape. Accordingly, the apparatus of the present invention has extremely large practicable effects when taking also the noticeably high energy recovery efficiency into consideration.

Figure 5:
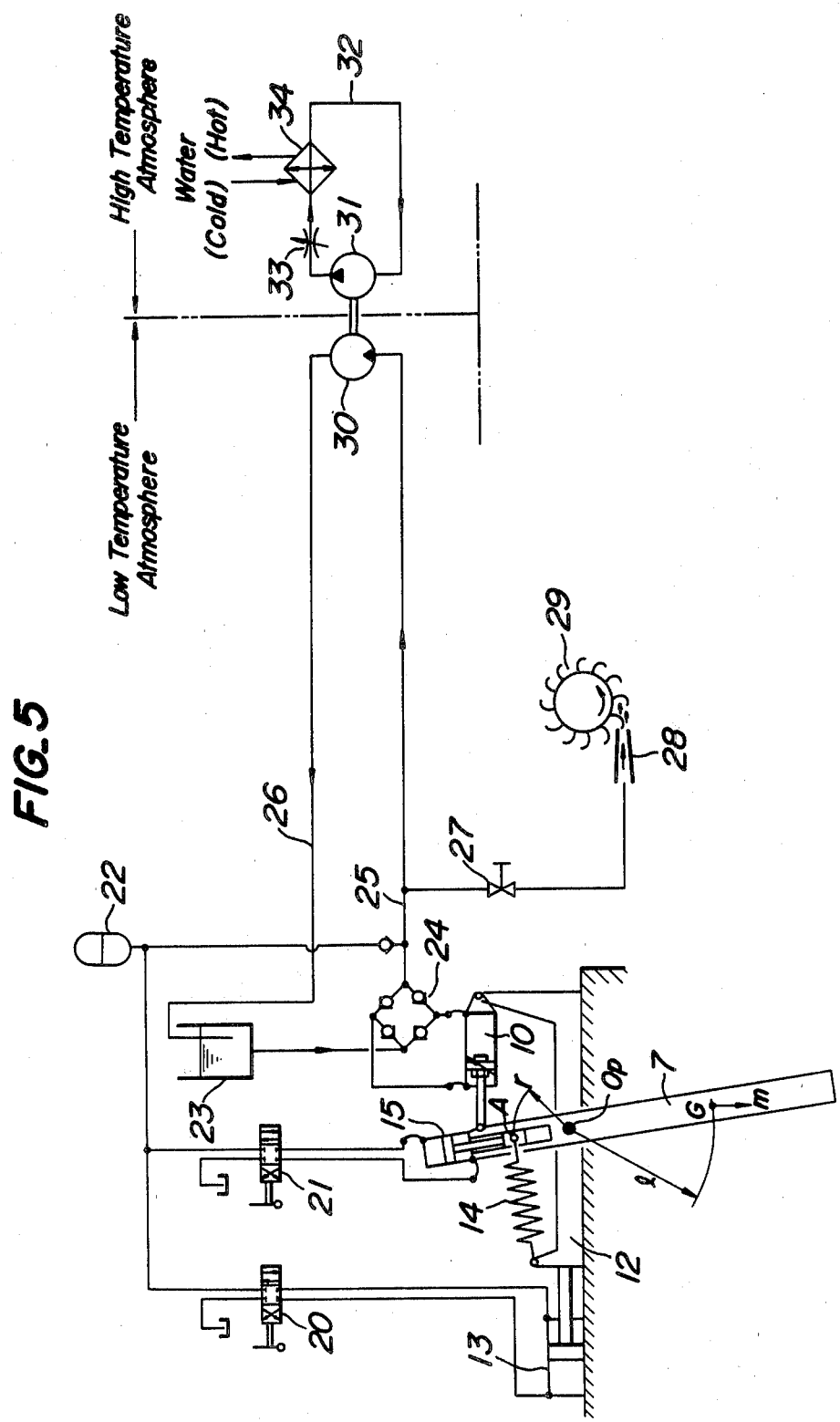
FIG. 5 is a schematic diagram showing apparatus wherein the present invention is used.

FIG. 5 is a block diagram wherein the apparatus of the present invention is used. In FIG. 5, the cylinder 10 is actuated by the pendulum 7 to suck oil from a tank 23 into a rectifying valve 24, and the sucked oil is introduced under pressure in a high pressure pipeline 25 from the rectifying valve 24. The oil under pressure actuates a hydraulic motor 30 and returns to the tank 23 via a return pipeline 26.

The hydraulic motor 30 actuates a hydraulic pump 31 to produce an oil current in a pipeline 32 in the direction shown by an arrow. The oil current generates heat to raise its temperature per se when passing through an orifice 33 and the heated oil warms water when passing through a heat exchanger 34.

The aforementioned line system is particularly useful when the wave energy is used as thermal energy, heat loss can easily be prevented by use of a heat insulating material because the pipelines 25 and 26 are arranged near a bank or a sea bulwark and exposed to low temperature, particularly when the apparatus of the present invention is operated at a north severe cold environment, whereas only the pipeline 32 in the heat utilization system has an elevated temperature. Of course, the aforementioned line system can easily be put into practice, since the step of converting wave energy to thermal energy is extremely simple.

If the oil in the high pressure pipeline 25 is injected from a nozzle 28 by opening a check valve 27 to actuate a turbine 29 for converting the pressurized wave energy to mechanical energy, the mechanical energy can be used easily in the form of an electric current, etc.

Change-over valves 20 and 21 are located in pipelines leading to the cylinders 13 and 15 from a pressure accumulator 22 for operating the cylinders 13 and 15. The necessary pressurized oil for the operations is the oil accumulated in the pressure accumulator 22 via the high pressure pipeline 25.

When using ocean energy, this type of apparatus should always be carefully employed to prevent damage from excessively large wave forces in stormy weather. In FIGS. 1-3, the pressure-receiving plate 8 of the pendulum 7 is set at an appropriate height hp so as to pass high waves exceeding the height hp over the pressure-receiving plate 8, thereby preventing wave forces larger than a predetermined value from acting on the pendulum 7 (refer also to FIG. 6). Also, as seen from FIG. 4, if the opening ratio K of the orifice 33 is taken sufficiently large, the load of the hydraulic pump 31 reaches zero and consequently the load of the cylinder 10 also reaches zero and thus the energy recovery efficiency is minor and the pendulum 7 is merely swung by the wave motion. As a result, excessively large wave motion power can be prevented from acting on the pendulum 7. Also, it is preferable that the cylinder 10 be a double-acting cylinder for preventing an excessive swinging movement of the pendulum 7.

Figure 6:
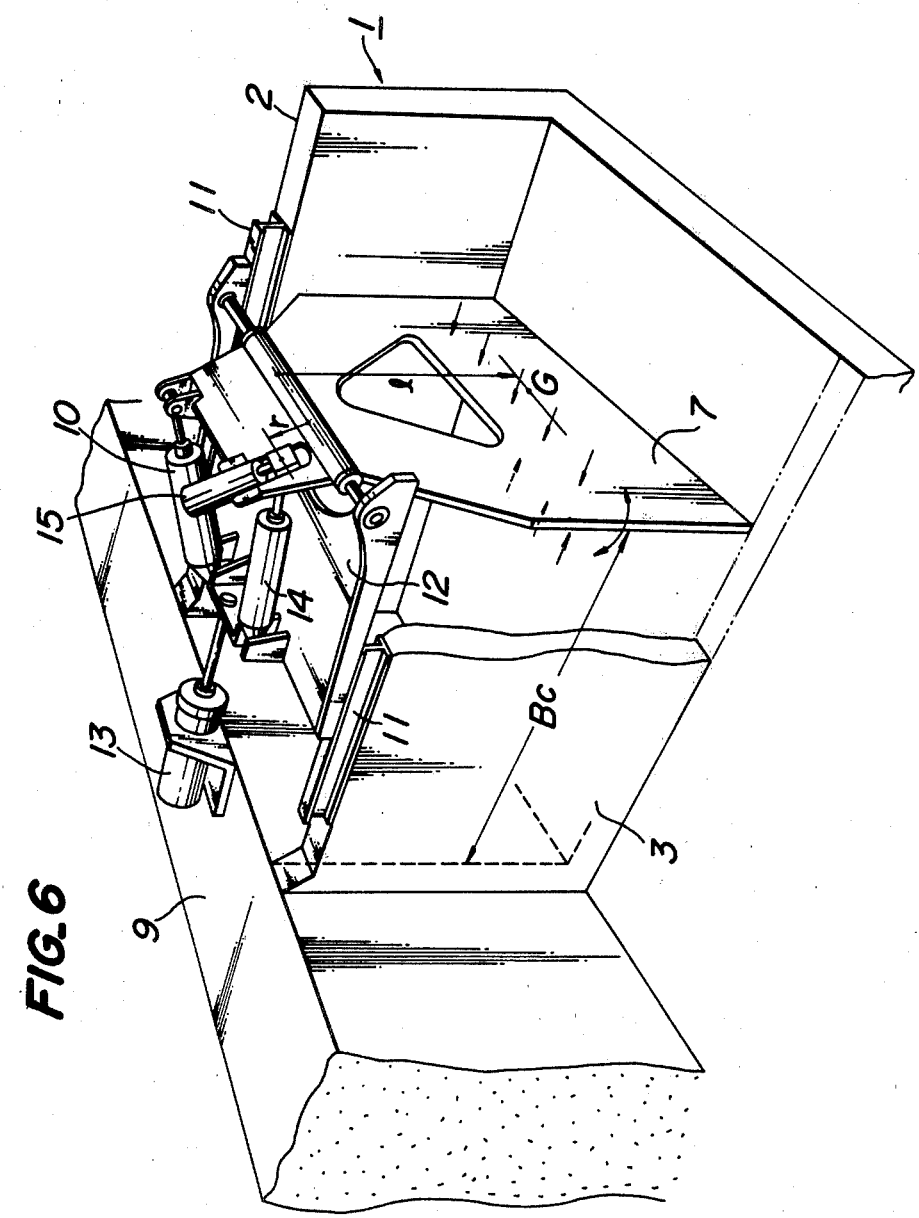
FIG. 6 is a perspective view of an embodiment of the apparatus of the present invention.

The back side plate 4 of the caisson 1 can be substituted by the front face of a bank 9, as shown in FIG. 6.

As explained above, the apparatus for absorbing wave energy according to the present invention has a simple structure, its investment and maintenance costs are low, damage thereof resulting from stormy weather can easily be prevented and it has extremely high energy recovery efficiency in any climatic conditions, so that it is eminently useful industrially.

Although the present invention has been explained in detail with reference to specific embodiments, it is of course apparent to those skilled in the art that many changes and modifications are possible without departing from the broad aspect and scope of the present invention as hereinafter claimed.

What is claimed is:

1. A resonant type apparatus for absorbing wave energy arranged at wave-breaking facilities, comprising, a caisson having a bottom plate, side plates, a backside plate and a top plate, at least a part of said top plate being omitted; a water chamber in the caisson having a length in a direction parallel to said side plates which is larger than ¼ of the wave length Lc of a stationary wave generated within said water chamber, a node of said stationary wave being formed in the water chamber at a distance of Lc/4 from the backside plate; a pendulum arranged at the position Lc/4 of the node of said stationary wave for swinging with a natural period Tp which is of substantially the same value as the natural period Tw of the stationary wave; whereby the pendulum is swung by the stationary wave to absorb and convert wave energy to useful available energy at high efficiency.

2. A resonant type apparatus for absorbing wave energy arranged at wave-breaking facilities, comprising, a caisson having a bottom plate, side plates, a backside plate and a top plate, at least a part of said top plate being omitted; a water chamber in the caisson having a length larger than ¼ of the wave length Lc of a stationary wave generated within the water chamber, a node of said stationary wave in the water chamber being formed at a distance of Lc/4 from the backside plate; a pendulum arranged at the position Lc/4 of the node of said stationary wave for swinging with a natural period Tp which is of substantially the same value as the natural period Tw of the stationary wave; a displaceable carrier mounted on the pendulum and an energy converting device driven directly by the pendulum; means for displacing the carrier to the position of the node of the stationary wave whereby the pendulum is swung by the stationary wave to absorb and convert wave energy to useful available energy at high efficiency; a device for monitoring the wavelength Lc; and means to displace automatically the carrier depending on the monitored value of the wavelength Lc in the water chamber.

3. A resonant type apparatus for absorbing wave energy arranged at wave-breaking facilities, comprising, a caisson having a bottom plate, side plates, a backside plate and a top plate at least a part of said top plate being omitted; a water chamber in the caisson having a length larger than ¼ of the wave length Lc of a stationary wave generated within the water chamber, a node of said stationary wave being formed in the water chamber at a distance of Lc/4 from the backside plate; a pendulum arranged at the position Lc/4 of the node of said stationary wave for swinging with a natural period Tp which is substantially the same value as the natural period Tw of the stationary wave; at least one resilient member connected to a horizontal axis A arranged at the top of the pendulum; whereby the natural period of the pendulum is adjusted and the pendulum is swung by the stationary wave to absorb and convert wave energy to useful available energy at high efficiency.

4. An apparatus as defined in claim 3, wherein the spring constant of the resilient member is adjustable.

5. A resonant type apparatus for absorbing wave energy arranged at wave-breaking facilities, comprising, a caisson having a bottom plate, side plates, a backside plate and a top plate, at least a part of said top plate being omitted; a water chamber in the caisson having a length larger than ¼ of the wave length Lc of a stationary wave generated within the water chamber, a node of said stationary wave being formed in the water chamber at a distance of Lc/4 from the backside plate; a pendulum arranged at the position Lc/4 of the node of said stationary wave for swinging with a natural period Tp which is substantially the same value as the natural period Tw of the stationary wave; at least one resilient member connected to a horizontal axis A arranged at the top of the pendulum, the level of the horizontal axis being adjustable; and a means arranged on the top of the pendulum for adjusting the length between the swinging center Op of the pendulum and the horizontal axis A; whereby the natural period of the pendulum is adjustable and the pendulum is swung by the stationary wave to absorb and convert wave energy to useful available energy at high efficiency.

6. An apparatus as defined in claim 5, wherein said means is a hydraulic cylinder having a piston at its lower end for engaging with the axis A.

7. A resonant type apparatus for absorbing wave energy located at a wave-breaking facility, comprising
a caisson at least partially open at the top having a bottom plate, a pair of side plates secured to said bottom plate and a back plate joining said side plates and secured to said bottom plate, said caisson forming a water chamber for generating a stationary wave having a length Lc and a natural period Tw, the length of said caisson in the direction parallel to said plates being at least Lc/4 and said stationary wave having a node at a distance of Lc/4 from said back plate;
a carrier slidably mounted on said side plates for movement therealong;
a pendulum rotatably secured to said carrier having a plane surface transverse to said side plates positioned at the node of said stationary wave, said pendulum having a natural period Tp;
means for displacing said carrier to maintain said pendulum positioned at said node;
means attached to said pendulum for adjusting the natural period Tp thereof to maintain said period substantially equal to the natural period Tw of said stationary wave, whereby a resonant state is maintained with changes in the period of said stationary wave; and
means secured to said pendulum for effectively converting the energy absorbed therein from said stationary wave to useful available energy.

* * * * *